Patented Aug. 1, 1950

2,517,035

UNITED STATES PATENT OFFICE 2,517,035

CATALYSTS FOR HYDROCARBON SYNTHESIS

Eugene E. Sensel, Beacon, and Roland A. Beck, Fishkill, N. Y., assignors to The Texas Company, New York, N. Y., a corporation of Delaware No Drawing. Application March 28, 1947, Serial No. 737,996

2 Claims. (Cl. 260—449.6)

This invention relates to a novel catalyst for use in the conversion of carbon monoxide-containing reactants into hydrocarbons, oxygen-containing compounds and the like. More specifically, the invention discloses a novel highly active promoter for a catalyst which contains a member of the iron group as an active constituent.

According to this invention lanthanum oxide, a rare earth metal oxide, is a highly effective promoter for hydrogenation catalysts containing iron, cobalt or nickel or a mixture thereof as the active constituent. Even in very small concentrations, for example, concentrations as low as a small fraction of a weight per cent, the incorporation of lanthanum oxide in a cobalt catalyst in place of a promoter such as thoria, has produced a highly active catalyst.

The conversion of carbon monoxide-containing reactants by reaction with hydrogen to hydrocarbons, oxygen-containing compounds and the like, is generally effected by contact of the reactants with a catalyst in which the main active constituent is iron, cobalt, nickel or a mixture thereof under selected conditions of temperature and pressure which are consonant with the desired reaction. Supported and unsupported, precipitated and fused types of catalyst have all been proposed to effect this reaction; the different types of proposed catalysts possess characteristic properties which make them suitable to yield particular products of conversion and for specific types of processes, for example, a fused unsupported iron catalyst has proven effective in a fluid type conversion in which gasoline hydrocarbons are the desired product. A characteristic which is common to all the various types of catalysts, whether they be supported or unsupported, precipitated or fused, is that they are more effective when they contain small percentages ranging from about 0.5 to 10 weight per cent of various compounds as promoters. The present invention, therefore, contemplates using lanthanum oxide as a highly active promoter in the foregoing types of catalysts for the conversion of carbon monoxide-containing reactants. Moreover, it may be employed in conjunction with or in place of the more conventional and better known promoters, such as thoria and magnesia.

The use of lanthanum oxide as a promoter has particular application in the preparation of precipitated supported cobalt catalysts. A precipitated, supported cobalt catalyst containing about 32 per cent cobalt by weight, about 64 per cent of an uncalcined diatomaceous earth comprising mainly silica plus minor portions of oxides such as alumina and ferric oxide (and currently marketed under the trade name Filter Cel) which catalyst has been promoted with minor amounts, namely about 3 per cent magnesia and 1 per cent thoria, is a highly active type of cobalt catalyst for the synthesis of gasoline hydrocarbons and for the conversion of carbon monoxide-containing reactants to specific oxygen-containing compounds such as alcohols, aldehydes, ketones, etc. The substitution of lanthanum oxide for the thoria results in the formation of a catalyst which is materially more active, as measured by the yield of liquid hydrocarbons, than the conventional supported cobalt catalyst promoted by magnesia and thoria. Even when the concentration of lanthanum oxide is as low as 0.39 weight per cent in a supported, magnesia- and lanthanum oxide-promoted cobalt catalyst, the resulting catalyst is superior to a supported cobalt catalyst promoted with magnesia and thoria.

In order to demonstrate the superiority of lanthanum oxide-promoted catalysts, a comparison will be made of a cobalt catalyst supported on diatomaceous earth and promoted with magnesia and thoria and of a cobalt catalyst supported on diatomaceous earth and promoted with magnesia and lanthanum oxide. In order to facilitate the comparison, similar procedures were used to prepare the two catalysts which were then employed under similar conversion conditions for the conversion of a synthesis gas mixture containing carbon monoxide and hydrogen.

*Example I.*—The constituents were added to this catalyst in order that it would have an approximate composition on reduction of 32 parts of cobalt, 1 part of thoria, 3 parts of magnesia and 64 parts of uncalcined diatomaceous earth by weight. 1200 grams of cobalt nitrate

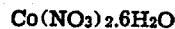
$Co(NO_3)_2.6H_2O$ 145 grams of magnesium nitrate $Mg(NO_3)_2.6H_2O$ and 16 grams of thorium nitrate $Th(NO_3)_4.H_2O$ were dissolved in 4670 grams of distilled water. 486 grams of uncalcined diatomaceous earth comprising mainly silica with minor quantities of alumina and ferric oxide were added to this aqueous mixture which was then stirred to form a smooth slurry, after which 4,875 grams of a 10.3 per cent solution of sodium carbonate, $Na_2CO_3$, were added to effect precipitation of the metallic constituents as carbonates. The precipitate was filtered and was thereafter washed with water at room temperature until the sodium oxide, $Na_2O$, content of a small, separate sample dried for three hours at 1,000° F. was below 0.05 per cent. The filter cake was then broken into ½″ lumps and dried at 250° F. until the material showed a 15–20 per cent loss in weight when a small sample was heated to 1,000° F. for one hour. The material was then ground to 40 mesh size and pelleted in ⅛″ dies. The analysis of the catalyst prior to reduction showed 29 per cent cobalt oxide, 0.75 per cent thoria, 1.66 per cent magnesia, 46 per cent diatomaceous earth, 8.5 per cent $CO_2$, 11.2 per cent water and 0.04 per cent sodium oxide.

This catalyst was then reduced by treating with a stream of pure hydrogen at 662° F. for a period of 24 hours employing a hydrogen space velocity, calculated at 60° F. and 0 p. s. i. g., ranging from 100 to 120. Thereafter the catalyst was conditioned by passing synthesis gas, containing one part by volume of carbon monoxide and two parts by volume of hydrogen, through it for eight hours at a space velocity of 100 while the temperature of the reactor was raised uniformly from 300 to 374° F. At the end of this time, the catalyst was evaluated with the aforesaid synthesis gas in a fixed bed unit at 374° F. This magnesia-, thoria-promoted supported cobalt catalyst at a reaction temperature of 374° F. produced 130 grams of $C_3+$ liquid hydrocarbons per cubic meter of synthesis gas; this is equivalent to 61 per cent of the theoretical conversion to hydrocarbons. 159 grams of water and 17 grams of carbon dioxide per cubic meter of synthesis gas were simultaneously produced.

*Example II.*—The constituents were added in this instance in order to produce a catalyst which on reduction would have an approximate composition of 32 parts cobalt, one part lanthanum oxide, 3 parts magnesia and 64 parts diatomaceous earth. 1200 grams of cobalt nitrate,

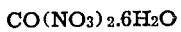

145 grams of magnesium nitrate, $Mg(NO_3)_2.6H_2O$, and 16 grams of lanthanum nitrate,

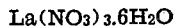

were dissolved in 4670 grams of distilled water. 486 grams of diatomaceous earth having the same composition as that used in the previous example were then added to the mixture and stirred to form a smooth slurry, after which 4,875 grams of 10.3 per cent solution of sodium carbonate were added to effect the precipitation of the metallic constituents as carbonates. The precipitate was filtered and thereafter was washed with water at room temperature until the sodium oxide content of a small separate sample dried for three hours at 1,000° F. was below 0.05 per cent. The filter cake was then broken into ½" lumps and dried at 250° F. until the material showed a 15 to 20 per cent loss in weight when a small sample was heated to 1,000° F. for one hour. The material was then ground to 40 mesh size and pelleted in ⅛" dies. The analysis of this catalyst in the unreduced state is cobalt oxide—32 per cent, lanthanum oxide—0.39 per cent, magnesia—2 per cent, diatomaceous earth—46 per cent, $CO_2$—8 per cent, water—12 per cent, sodium oxide—0.006 per cent. This catalyst was then reduced by treating with a stream of pure hydrogen at 662° F. for a period of 24 hours employing a hydrogen space velocity, calculated at 60° F. and atmospheric pressure, ranging from 100 to 120. Thereafter the catalyst was conditioned by passing synthesis gas of aforesaid composition through it for an eight hour period at a space velocity of 100 while the temperature of the reactor was raised uniformly from 300 to 374° F. This catalyst was then evaluated at operating conditions which were similar to those employed for the magnesia-, thoria-promoted catalyst of Example I, namely 374° F. and atmospheric pressure; 160 grams of $C_3+$ hydrocarbons per cubic meter of synthesis gas were obtained with the magnesia-, lanthanum oxide-promoted catalyst, which yield amounts to 75 per cent theoretical conversion to liquid hydrocarbons. 230 grams of water and 25 grams of carbon dioxide per cubic meter of synthesis gas were simultaneously produced.

From the comparison of these results, it may be seen that the lanthanum oxide-promoted catalyst is approximately 23 per cent more effective for the catalytic conversion of carbon monoxide and hydrogen to liquid hydrocarbons than was the thoria-promoted cobalt catalyst. This increase in efficiency is significant and clearly establishes the value of lanthanum oxide as a promoter for catalysts used in the conversion of carbon monoxide-containing reactants.

It is contemplated that a mixture of rare earths containing a major portion of lanthanum oxide may be used as a promoter rather than lanthanum oxide alone.

It is further contemplated that lanthanum oxide can be used to promote cobalt catalysts employed for the reaction of carbon monoxide with an olefin to produce specific oxygen-containing compounds such as aldehydes, alcohols and ketones. Moreover, fused iron catalysts comprising 90–95% iron may also be promoted with lanthanum oxide; a fused iron type of catalyst has proven specifically adapted for fluid catalysis because of its high density and its low attrition rate.

Obviously many modifications and variations of the invention, as hereinbefore set forth, may be made without departing from the spirit and scope thereof and, therefore, only such limitations should be imposed as are indicated in the appended claims.

We claim:

1. In a process for the synthesis of normally liquid hydrocarbons and oxygen-containing organic compounds by the interaction of carbon monoxide and a synthesis reactant selected from the group consisting of hydrogen and olefins in the presence of a cobalt catalyst, the improvement which comprises contacting said carbon monoxide and said synthesis reactant under reaction conditions with a catalyst consisting essentially of cobalt promoted with from about 0.5 to about 10 weight percent lanthanum oxide and containing about 3 percent by weight of magnesia.

2. In a process for the synthesis of normally liquid hydrocarbons and oxygen-containing organic compounds by the interaction of carbon monoxide and a synthesis reactant selected from the group consisting of hydrogen and olefins in the presence of a cobalt catalyst, the improvement which comprises contacting said carbon monoxide and said synthesis reactant under reaction conditions with a catalyst composed of about 32 percent cobalt by weight, about 64 percent calcined diatomaceous earth by weight, about 3 percent magnesia by weight, and about 1 percent lanthanum oxide by weight.

EUGENE E. SENSEL.
ROLAND A. BECK.

REFERENCES CITED

The following references are of record in the file of this patent:

UNITED STATES PATENTS

| Number | Name | Date |
| --- | --- | --- |
| 1,148,570 | Bosch et al. | Aug. 3, 1915 |
| 1,801,382 | Wietzel et al. | Apr. 21, 1931 |
| 1,909,442 | Williams | May 16, 1933 |
| 2,292,570 | Klemm et al. | Aug. 11, 1942 |
| 2,365,094 | Michael et al. | Dec. 12, 1944 |
| 2,369,956 | Feisst et al. | Feb. 20, 1945 |